United States Patent

[11] 3,575,399

[72] Inventor Thomas Gordon Hart
San Francisco, Calif.
[21] Appl. No. 870,842
[22] Filed Oct. 20, 1969
Division of Ser. No. 478,612, Aug. 10, 1965 abandoned
[45] Patented Apr. 20, 1971
[73] Assignee Phelps Dodge Corporation
New York, N.Y.

[54] APPARATUS FOR PURIFICATION OF COPPER
8 Claims, 9 Drawing Figs.
[52] U.S. Cl. .................................................. 266/11,
75/72, 75/93, 266/33, 266/34
[51] Int. Cl. ...................................................... C22b 15/14
[50] Field of Search .......................................... 266/11, 33,
34, 34 (V); 75/72, 76, 93

[56] References Cited
UNITED STATES PATENTS
2,054,921 9/1936 Betterton .................... 266/34

Primary Examiner—Gerald A. Dost
Attorney—Davis, Hoxie, Faithfull and Hapgood

ABSTRACT: Copper is refined by melting the copper in a hydrogen atmosphere thereby dissolving into the copper substantial amounts of oxygen impurities. The molten copper is then subjected to vacuum treatment to remove the excess hydrogen, thereby causing agitation of the molten copper to improve the removal of volatile impurities.

INVENTOR.
THOMAS GORDON HART

ATTORNEYS.

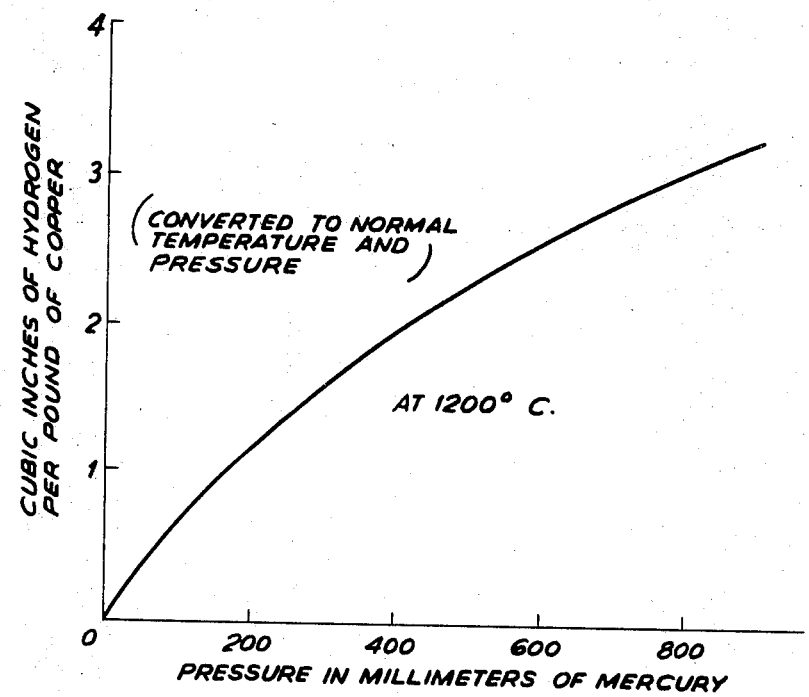
FIG. 5
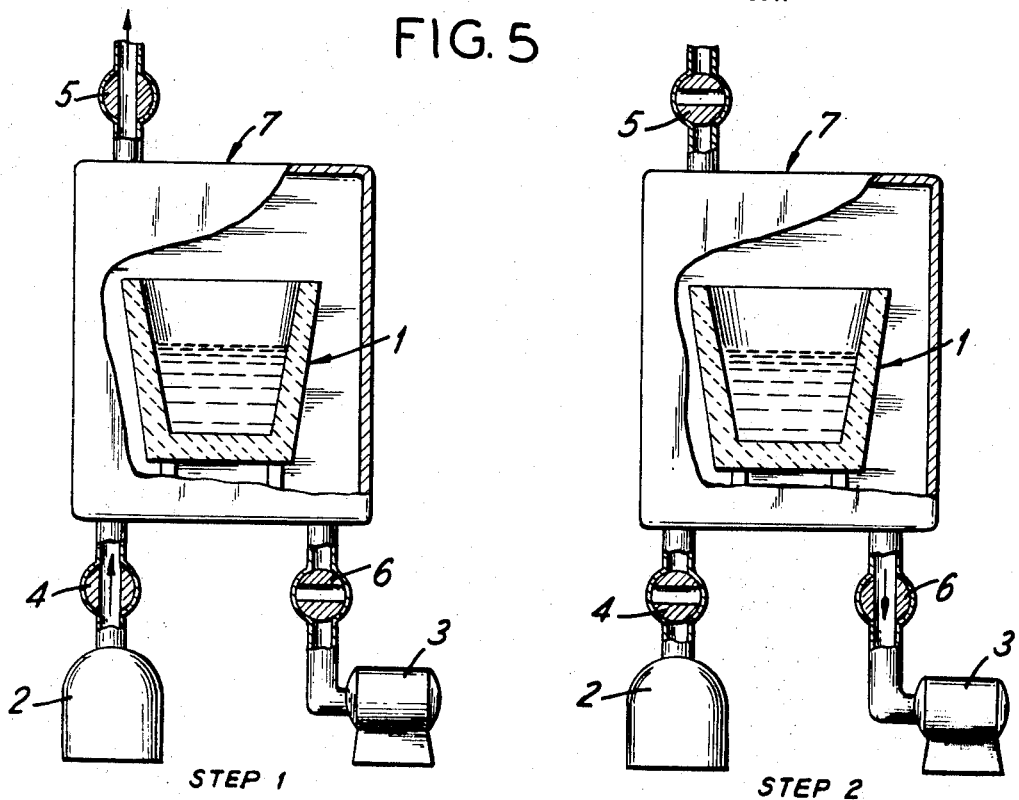
STEP 1
FIG.6a
STEP 2
FIG.6b
INVENTOR.
THOMAS GORDON HART
BY
Davis, Hoxie, Faithfull & Hapgood
ATTORNEYS.

INVENTOR.
THOMAS GORDON HART

APPARATUS FOR PURIFICATION OF COPPER

This application is a division of Ser. No. 478,612, filed Aug. 10, 1965, now abandoned.

This invention relates to the purification of copper and particularly to the further purification of electrolytically refined copper.

Broadly speaking the invention comprises the method of purifying copper by prolonged treatment of copper in an atmosphere containing hydrogen so as to reduce substantially the oxides in the copper and so as, additionally, to dissolve appreciable quantities of hydrogen in the copper and subsequently vacuum treating the hydrogen treated copper. The main advantages of this novel purification method over prior art methods are due to the unique complementary actions of the prolonged hydrogen treatment and the appropriately related vacuum treatment, the one overcoming the disadvantages of the other. Heretofore prolonged hydrogen treatment has not been commercially used as an oxide reduction method in copper purification because the high solubility of hydrogen in molten copper has caused severe difficulties with porosity upon casting the purified copper; in this connection, if the hydrogen treatment is prolonged enough that the oxide reduction is substantially completed before this treatment is terminated, in accordance with the present invention, subsequent vacuum treatment, in accordance with the present invention, readily removes the dissolved hydrogen and thereby overcomes the difficulties with porosity upon casting. On the other hand, heretofore vacuum treatment, although uniquely capable of removing such minor impurities as lead, solenium and tellurium from copper, has not been commercially used on appreciable scale for this purpose because of the relative slowness of its purification action. In this connection, the agitation of the molten copper caused by the rapid release by the vacuum treatment of dissolved hydrogen from the hydrogen treatment considerably quickens the purification action. Hence, by combining prolonged hydrogen treatment with appropriate vacuum treatment with vacuum treatment, in accordance with the present invention, the removal of both major and minor impurities from copper is accomplished with great facility and without the disadvantages to be expected from these two treatments when used separately. The present invention therefore constitutes a major improvement in the commercial art of copper purification, being capable of purifying copper to a greater degree than hitherto and with greater economy than hitherto.

The broad purpose of the invention is accordingly to provide an improved method of copper purification. Somewhat narrower purposes of the invention are as follows:

First, to provide a method for using prolonged hydrogen treatment in the purification of copper without penalty of porosity in the purified copper;

Second, to provide a method for using vacuum treatment in the purification of copper without need for complex apparatus so as to increase the purification rate;

Third, to provide a method of removing oxygen and sulfur from copper so that subsequent further purification by vacuum treatment may be accomplished in apparatus made of material which would be undesirably acted upon were oxygen and sulfur to be present in the copper;

Fourth, to provide a method of removing oxygen, sulfur occluded gases and metal impurities from electrolytic cathode copper while concurrently melting and casting this cathode copper into useful shapes for fabrication of products such as wire, sheet, strip, foil and tube; and Finally, to provide preferred apparatus for accomplishing the broad purpose of the invention.

An understanding of these various purposes of the present invention will be gained from the following drawings of which:

FIG. 5 is a graphic illustration of the variation of the solubility of hydrogen in copper at 1200° C. with pressure;

FIGS. 6a and 6b are diagrammatic illustrations of simple apparatus for implementing the method of the present invention;

Figure 1:
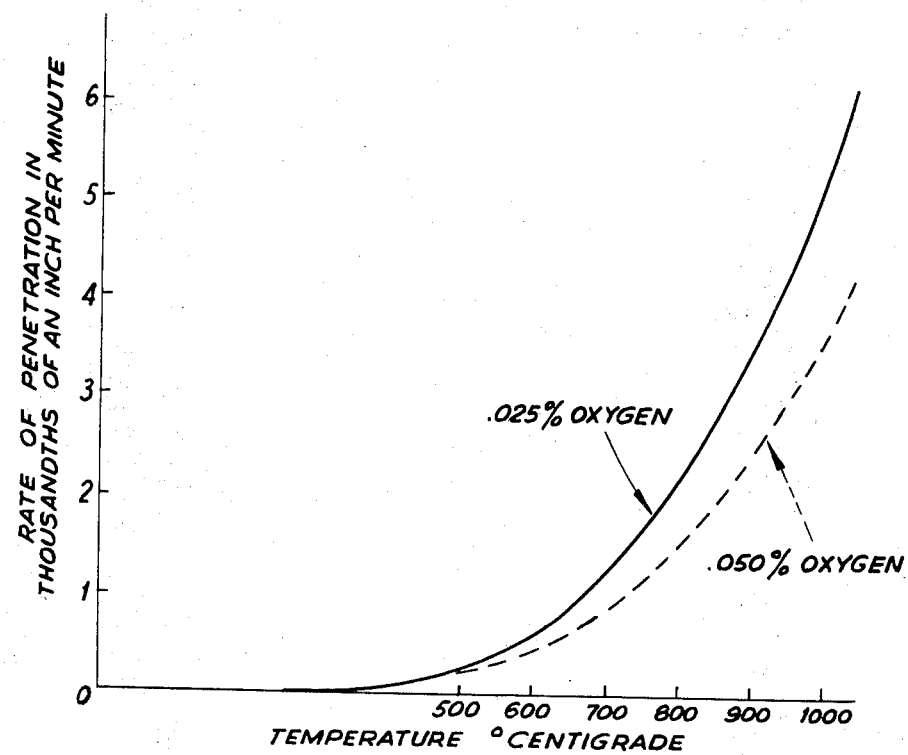
FIG. 1 is a graphic illustration of the effects of oxide level and temperature on the rate of penetration of hydrogen into copper.

It should be understood that copper refined by electrolytic process is commonly termed "cathode-copper." Cathode-copper is usually in the form of plates about three feet square and a half inch thick. These cathode plates are unsuited for direct fabrication into products such as wire, strip, tubing, etc., because of their shape and rough form and they are therefore melted and cast into useful shapes, for example cylindrical billets, before further use. If further contamination is avoided during the melting and casting, the cast copper so produced from untreated cathode copper is of high quality but nevertheless contains impurities which, albeit in small amounts, undesirably affect the performance of the copper for a number of applications. These impurities are principally oxygen, sulfur occluded gases and metals such as lead, mercury, tellurium and selenium. The oxygen is due mainly to surface oxidation of the cathode plates during processing and storage. The sulfur is due mainly to inclusions and surface residuals of sulfur chemicals from the electrolytic process. The occluded gases are due to gas assimilation during the electrolytic process, during storage, and during melting. The metal impurities are directly carried over from the cathode copper and reflect anode impurities and electrolytic tank impurities. It is common experience that all these impurities vary widely in amount.

Improvement in the quality of cast copper produced by melting and casting cathode copper has heretofore been obtained in a number of ways. An atmosphere which avoids oxidation during melting and casting and melting vessels and launders which do not contaminate the copper are, of course, of mandatory use for insuring that the impurities in the cast copper do not much exceed the impurities in the cathode copper, as outlined above. Once further contamination is so avoided the impurity level in the case copper has heretofore been most commonly and simply reduced by reducing the impurity level in the cathode copper. The oxygen content has been reduced by selecting the cathode copper so as to reject any that shows heavy surface oxidation. The sulfur content has been reduced by water washing the cathode copper so as to remove soluble sulfur chemical residuals from the surfaces. The oxygen and sulfur contents have been yet further reduced by chemical treatment of the cathode copper so as to remove surface oxides and water-insoluble sulfur chemical deposits. These various common pretreatments of the cathode copper prior to melting can serve to reduce the oxygen and sulfur levels in the cast copper to a very low level providing the cathode copper is of high quality to begin with, and in such circumstance these pretreatments have been widely practiced.

When the cathode copper is not of such high quality, for example, being so heavily oxidized that selection is not economic and having surface characteristics which render chemical treatment not fully effective, oxygen removal during the melting process has been conventionally practiced. This oxygen removal during melting has heretofore employed either or both of two methods. The first and most widely used method is that of "carbon reduction" as, for example, by carbon powder in contact with the melt. The second method is that of "carbon monoxide reduction" as, for example, by melting in an atmosphere which contains a high percentage of carbon monoxide. Neither of these deoxidation methods is more than partially effective and consequently they are both commonly used merely as supplements to the pretreatment methods. Melting in an atmosphere containing hydrogen rather than, or in addition to, carbon monoxide has not found favor on a large commercial scale for the reason, mentioned earlier, that the high solubility of the hydrogen in the molten copper (carbon monoxide has very low solubility) causes porosity difficulties upon casting, although techniques have been suggested for avoiding this difficulty. One such technique is to use vacuum treatment to promote the reducing action of the hydrogen so as to require only sufficient hydrogen to be present in the molten copper to account for the oxygen; hence by this technique substantially all the hydrogen in the molten copper is converted to water vapor and the problem of dissolved hydrogen causing porosity in the cast copper does not arise. It should be recognized that the above mentioned suggested technique of using vacuum treatment to promote the reducing action differs from the use of vacuum treatment in the method of the present invention in that in the case of the above mentioned suggested technique the vacuum treatment is contrived mainly so as to promote the reducing action, and so as to remove gases produced, as the byproduct of the reducing action, during the course of the vacuum treatment; whereas in the method of the present invention the vacuum treatment is contrived so as to remove relatively large amounts of dissolved hydrogen as well as volatile metal impurities, the reducing action and to some extent the evolution of the byproduct gases having been completed during the course of the prolonged hydrogen treatment.

From the above account of the methods most widely used heretofore for improving the quality of cast copper produced by melting and casting cathode copper, it will be understood that none of these methods removes occluded gases or metal impurities. Furthermore it will be understood that whereas oxygen removal has been commonly accomplished both by pretreatment of the cathode copper before melting and by treatment of the molten copper, sulfur removal has been commonly accomplished only by pretreatment. Moreover, it will be understood that none of these methods accomplishes more than partial removal of either oxygen or sulfur and therefore these methods even when used together result in amounts of oxygen and sulfur in the cast copper which, although below the amounts in the cathode copper, still somewhat reflect these latter amounts; this is to say, the purity of the cast copper produced by methods used heretofore depends somewhat on the purity of the cathode copper from which it is produced and is therefore subject to similar variation.

It should be noted further that insofar as the removal of occluded gases and metal impurities is concerned the method of vacuum treatment although well known has not been used heretofore on a commercial scale in the purification of copper. The predominant reason for this is that removal of some of the occluded gases and of the metal impurities by vacuum treatment has been relatively a very slow process, capable of being speeded up to commercially economic rates only by comparatively elaborate equipment. Hence, in particular, removal of metal impurities from copper by vacuum treatment of the molten copper has not been regarded as economically feasible heretofore.

Broadly, the method of the present invention comprises treating copper in an atmosphere containing hydrogen (as by preheating and melting copper in an atmosphere containing hydrogen, or preheating copper in an atmosphere containing hydrogen and melting the copper in some other atmosphere or preheating copper in some other atmosphere and melting the copper in an atmosphere containing hydrogen) subsequently exposing the molten copper to greatly reduced gas pressure and subsequently cooling and resolidifying the copper. By "preheating" copper I mean heating the copper to a temperature below the melting temperature in controlled fashion so that, for example, the copper may be maintained at an elevated temperature, say 1000° C. for an extended period of time, say 10 minutes. The reasons for preheating are discussed below. The main physical principles involved in this method are as follows:

When copper such as cathode copper is heated in an atmosphere containing hydrogen, this atmosphere being otherwise inert, three main actions occur:
1. hydrogen penetrates and dissolves in the copper;
2. copper oxides in and on the copper are reduced to copper by the hydrogen, water vapor being formed;
3. sulfur compounds in and on the copper are decomposed in part at least to gaseous products.

Figure 2:
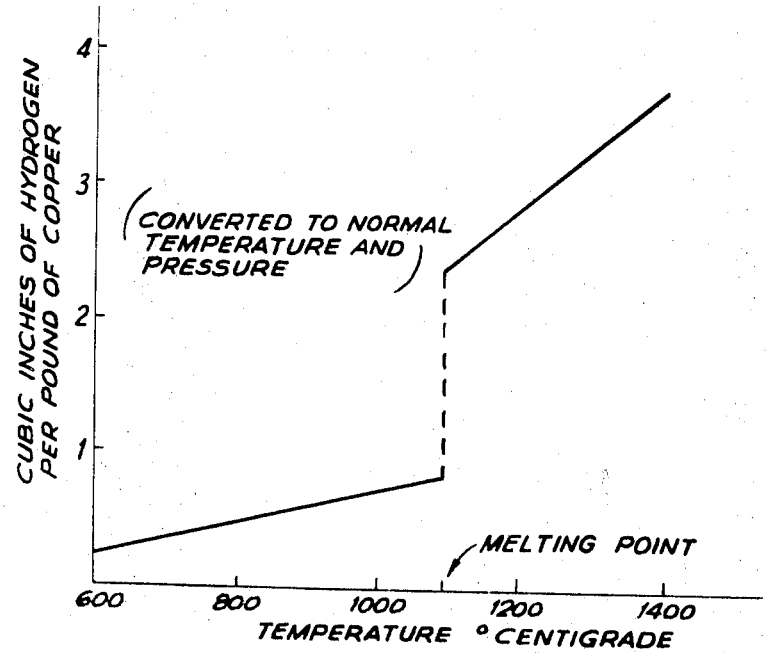
FIG. 2 is a graphic illustration of the variation in the solubility of hydrogen in copper with temperature.

The rates at which these above three actions proceed depend chiefly upon temperature, hydrogen concentration and pressure, and the amounts and concentrations of the copper oxides and sulfur compounds. Generally speaking, above 600° C. the three actions proceed somewhat in unison, the copper oxide reduction and the sulfur compound decomposition being completed when the hydrogen has fully penetrated and saturated the copper. Accordingly, if, for example, the bulk of the copper oxides are concentrated on the surface of the copper the bulk of the oxide reduction is completed when the hydrogen has penetrated below the surface. In the case of copper such as cathode copper this rate of penetration is indicated by FIG. 1, which shows the influences of temperature and oxide levels upon the rate. Similar behavior pertains in the case of sulfur compounds although the situation is more complex. FIG. 2 illustrates the variation in solubility of hydrogen in copper with temperature. It will be noted that whereas FIG. 1 includes a maximum temperature of 1,000° C. which is below the melting point of copper, FIG. 2 includes a maximum temperature of 1300° C. which is above melting point. The reason for this is that whereas solubility is easily measured for molten copper, rate of penetration is not. It will be further noted from FIG. 2 that the solubility shows a sharp increase at melting point (1083° C.). Similar transitional behavior in the rate of penetration at melting point might reasonably be expected in copper free of oxides and sulfur compounds but if these oxides and compounds are present in appreciable quantity their redistribution upon melting is the main factor in the transitional behavior of rate of penetration. The relevance of these various matters illustrated in FIGS. 1 and 2 will become obvious below.

Figure 3:
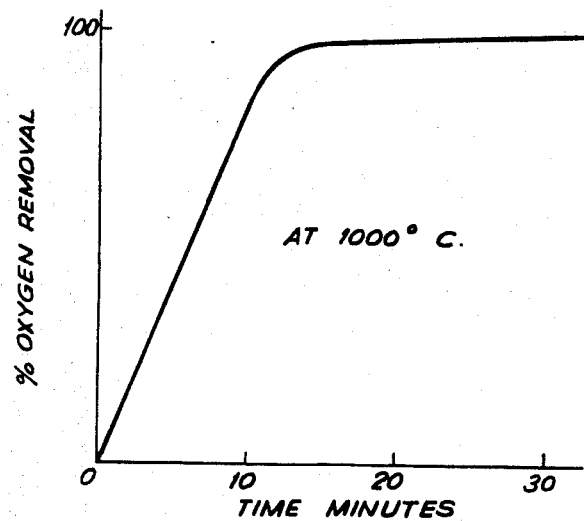
FIG. 3 is a graphic illustration of the rate of impurity removal from copper at 1000° C. by hydrogen as a function of time.
Figure 4:
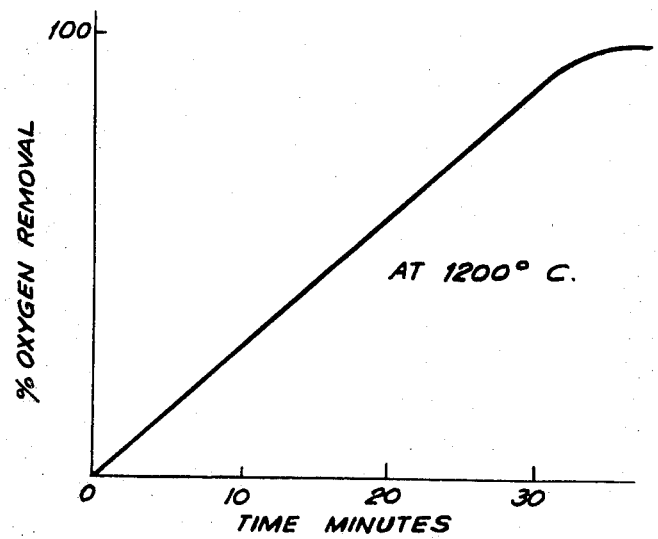
FIG. 4 is a graphic illustration of the rate of impurity removal from molten copper by hydrogen as a function of time.

The copper oxides and sulfur compounds in cathode copper are, as explained previously, mainly confined to the surface of the cathode plates. That is to say, referring to the oxides and sulfur compounds as "major-impurity," the major impurity concentration in cathode plates varies sharply in going in from the surface of the plates. The rate of penetration of hydrogen, into cathode plates below melting point, varies rapidly with time as the surface layers are penetrated. This fact leads to the assessment of major-impurity removal, by hydrogen action on a cathode plate at 1000° C., as a function of time, given in FIG. 3. By way of comparison FIG. 4 shows a similar assessment of major-impurity removal by hydrogen from cathode plates above melting point on the assumption that the same starting amount of impurity as in FIG. 3 is now distributed uniformly throughout the melt and that the same surface area is in contact with hydrogen. It will be noted from FIGS. 3 and 4 that, even given the favorable surface situation, in molten state the major-impurity removal by hydrogen treatment is considerably slower than in solid state up to at least 95 percent removal.

From FIGS. 3 and 4 it may be seen that complete major-impurity removal may be accomplished by hydrogen treatment either below melting point or above melting point. Hydrogen treatment prior to melting without such treatment after melting is particularly useful if, for example, (a) an amount of dissolved hydrogen well below saturation level in the molten state is desired, and (b) exposure time and exposure surface are difficult to control in the molten state.

Condition (a) may obtain if low porosity with minimum vacuum treatment time is of greater importance than substantial removal of volatile impurities. Condition (b) may obtain if the melting means is of the "batch" type in which a relatively large load is melted at one time and in which, consequently the portion of the load which melts first is molten for a much longer period than the portion of the load which melts last. Hydrogen treatment after melting without such treatment prior to melting is particularly useful if, for example, (a) the major impurities are not confined to the surfaces of the unmolten copper, (b) an amount of hydrogen approaching or equal to saturation level in the molten state is desired, and (c) heating prior to melting is more conveniently accomplished in an atmosphere other than hydrogen bearing atmosphere.

Condition (a) may be found in copper other than electrolytically refined copper. Condition (b) may obtain if substantial removal of volatile impurities is required. Condition (c) may obtain if a preheating furnace adapted to other atmosphere but not adapted to hydrogen bearing atmosphere is available.

In the case of cathode copper a combination of heating below melting point and heating above melting point is generally the preferred procedure if substantial volatile impurities are present in the copper and if substantial removal of these volatile impurities is required.

Referring again to FIG. 2, it will be observed that approximately four times as much hydrogen is dissolved in copper at 1200° C. as at 1000° C. Hence the amount of hydrogen dissolved in the process of substantially completing major-impurity removal by a combination of heating below melting point and heating above melting point will depend upon the durations of both heating periods, assuming the above melting point period is much less than required for saturation.

Insofar as gas removal by vacuum treatment is concerned, the dissolved hydrogen needs to be removed and those retained gases such as water vapor, hydrogen sulfide and sulfur dioxide which are byproducts of the impurity decomposition need to be removed. In this latter connection, most of the byproduct gases formed during the heating below melting point escape from the copper as soon as they are formed since they come mainly from impurity concentrated at the surface. On the other hand the byproduct gases formed during heating above melting point are to some extent retained in the copper since they come from impurity contained in the body of the melt. Generally speaking, the total gas content, including dissolved hydrogen and byproduct gases, in copper treated above melting point would likely be somewhat in excess of four times the gas content of copper treated below melting point, assuming the same total amount of impurity in each case.

As to mechanisms by which gases are removed from molten copper by vacuum treatment, it should be noted that generally the rates of gas removals are determined by factors whose relative significance varies with the gases in question. Hydrogen exhibits little tendency to remain in molten copper in amounts above saturation level at any particular temperature and gas pressure. That is to say when molten copper saturated with hydrogen at normal pressure is exposed to reduced pressure, hydrogen rapidly bubbles out so as to establish the new saturation condition appropriate to the reduced pressure. The variation in hydrogen saturation level with gas pressure at a temperature of 1200° C. is illustrated in FIG. 5. From FIG. 5 it will be discerned that the saturation level rapidly approaches zero as the pressure approaches zero. This behavior of hydrogen in solution in copper, insofar as removal by vacuum treatment is concerned, is in sharp contrast to the behavior of other gases. Some of these other gases, including water vapor and sulfur gases, show, in the absence of hydrogen, great tenacity for molten copper even at very low pressures and even though present in amounts above their normal solubility levels. In the presence of hydrogen, however, this tenacity of these gases is considerably moderated, as indeed in some cases is the normal solubility of these gases. Dissolved hydrogen both inhibits the solution of other gases in molten copper and facilitates their removal. This facilitation by dissolved hydrogen of the removal of other dissolved gases from molten copper by vacuum treatment indicates that the quantities and types of other dissolved gases in the molten copper has bearing on an optimum procedure for the hydrogen treatment. For example, a high level of sulfur impurity yielding a relatively high proportion of sulfur gases indicates that an optimum rate of total gas removal by vacuum treatment is obtained by a somewhat higher level of dissolved hydrogen than is required merely to reduce the copper oxides and decompose the sulfur compounds. This particular example it should be noted is given to illustrate that such considerations are involved rather than to give them particular emphasis. Of greater significance, insofar as the method of the present invention is concerned, is the bearing that the amount of dissolved hydrogen has on the removal by vacuum treatment of impurities such as lead, tellurium and selenium which are relatively unaffected by the hydrogen treatment. This aspect of the method of the present invention is discussed next.

In the present invention vacuum treatment comprises subjecting the molten copper to an environmental gas pressure well below atmospheric pressure for a period of time, as, for example, by enclosing the vessel in which the copper is melted, pumping out first the gas surrounding the melt as a consequence of prior treatment and then, subsequently, continuously pumping out the gas issuing from the melt as a consequence of the reduced gas pressure. As has already been stated, one result of such vacuum treatment upon copper heated and melted in hydrogen is the rapid removal of hydrogen and along with the hydrogen the removal of byproduct and other occluded gases. A further result of the vacuum treatment is the removal of impurities which have appreciable vapor pressures at molten copper temperatures, these impurities include such metals as silver, lead, antimony, arsenic, tin, tellurium and selenium.

The removal of gases, particularly hydrogen, and the removal of volatile metal impurities from molten copper by vacuum treatment both depends on "pressure equilibrium situations" but to a different degree. Hydrogen, for example, is removed to the extent that the pressure on the copper is insufficient to maintain the hydrogen in solution in the copper as determined by the pressure/solubility relationship indicated in FIG. 5. Hence, for example, when a deep pool of molten copper saturated with hydrogen at atmospheric pressure is exposed to a gas pressure equivalent to 1 millimeter of mercury, hydrogen readily issues from the melt-down to a depth at which the hydrostatic pressure is equal to atmospheric pressure less 1 millimeter of mercury. That is to say, for molten copper saturated with hydrogen, hydrogen issues from the molten copper in volumes varying from about 3000 times (at 1200° C. and 1 mm. of mercury pressure) the volume of the copper at the surface, down to zero at barometric depth less 1 millimeter. It will be readily understood of course that once the issuance of hydrogen from the molten copper commences, the rate of issuance is in large part determined by the pressures established throughout and above the molten copper by the issuing hydrogen itself. Insofar as the pressure above the melt is concerned this depends on the rate at which hydrogen is pumped out of the enclosure as related to the rate at which hydrogen issues from the melt. Insofar as the pressures below the melt surface are concerned, these depend in very complex fashion upon the bubbling action of the issuing hydrogen as well as upon hydrostatic depth and pressure above the melt. With pumping rates sufficient to maintain a gas pressure above the melt well below atmospheric pressure the bubbling action of the issuing hydrogen is, of course, in view of the relatively very large volumes of hydrogen involved, extremely vigorous.

On the other hand the pressure equilibrium situations which control the removal of volatile impurities such as lead are of a quite different order than those which control the removal of hydrogen and other gases. Lead, for example, has a vapor pressure equivalent to about 10 mm. of mercury at 1200° C. That is to say, for example, in the circumstance that lead is present in the molten copper in the saturation amount at atmospheric pressure, lead vapor issues from the melt only to a depth of about 14 mm. if the pressure above the melt is reduced to the equivalent of 1 mm. of mercury—assuming of course that the pool of molten copper is stagnant. Hence it will be understood that in a typical situation more lead is removed from molten copper in a given time by vacuum exposure if the copper is agitated so as to expose all the copper to surface pressures than if it is not. Generally speaking this facilitation of removal by agitation is true of all the volatile impurities which may be contained in copper, even though some of these impurities, for example selenium, have very much higher vapor pressures than lead at molten copper temperatures and are therefore not significantly affected by the "depth effect." In this connection the commonplace example of what happens when soda water is shaken may be noted as illustration of the effect of agitation on the retention of gases and vapors by liquids. This "soda water effect" applies, in varying extent, to all vapors and gases dissolved in molten copper. This is to say, the removal of impurities from molten copper by vacuum treatment is facilitated by agitation of the copper because of the "soda water" effect even if the vapor pressures of the impurities are high enough that the aforementioned "depth effect" is not significant. Other phenomena such as the effect of one impurity on the retention of another are of course also involved in impurity removal by vacuum treatment. It will now be understood that the removal from molten copper by vacuum treatment of such volatile impurities as tin, lead, arsenic, antimony, tellurium, selenium and silver is greatly facilitated by the agitation of the molten copper due to the issuance of dissolved hydrogen.

It should be noted that the facilitation of volatile impurity removal by hydrogen issuance is of importance in determining an optimum hydrogen content for the molten copper. That is to say an optimum preheating and melting procedure for the copper, which affects hydrogen content as previously outlined, is determined in part at least by the requirements for removal of volatile impurities by vacuum treatment, even though this removal is not directly affected by the procedure. The significance of this and other matters in the choice of preferred apparatus for implementing the method of the present invention are discussed below.

The method of the present invention can be simply implemented by the means shown diagrammatically in FIGS. 6a and 6b. With reference to those FIGS. the hydrogen treatment and the vacuum treatment are shown to be accomplished sequentially in the same apparatus by "step 1" and "step 2." In FIGS. 6a and 6b, 1 is a conventional copper melting furnace of the "coreless induction" type, 2 is a conventional source of hydrogen bearing atmosphere produced for example, by controlled combustion of natural gas, 3 is a conventional vacuum pump, 4, 5 and 6 are valves for selectively closing off the atmosphere source of the vacuum pump as shown. It will, of course, be understood that means for feeding and discharging the furnace 1 which are not shown in FIGS. 6a and 6b for sake of clarity, are necessary and these may comprise most simply a removable access cover in enclosure 7 into which solid copper may be fed into furnace 1, a means for tipping furnace 1, a removable port in enclosure 7 out of which molten copper may be poured and means for providing an inert atmosphere for protecting the pouring copper from atmospheric oxidation. These latter various means not shown in FIGS. 6a and 6b are well known in the art. The purification procedure with the apparatus of FIGS. 6a and 6b is as follows: Furnace 1 is loaded with impure copper, enclosure 7 is sealed and purged with hydrogen bearing atmosphere which enters through valve 4 and exits through valve 5. The impure copper is then heated and melted while a flow of hydrogen bearing atmosphere through enclosure 7 is maintained. Valves 4 and 5 are then closed, pump 3 is started and valve 6 is opened. Pumping is maintained for a period of time after which valve 6 is closed and pump 3 is stopped. Valve 5 is then opened to admit inert atmosphere to enclosure 7, the exit port is removed and the purified copper poured out by tipping furnace 1.

While the apparatus of FIGS. 6a and 6b is practical and can be used to implement the method of the present invention, it has many disadvantages. Firstly, the apparatus of FIGS. 6a and 6b does not provide for optimum use of either the hydrogen treatment or the vacuum treatment or for optimum relationship between these two treatments in accordance with the teachings outlined above. Particularly, in this first connection, the time of heating the impure copper prior to melting is not readily controllable, the surface exposure of the copper to the hydrogen bearing atmosphere before, during and after melting is minimal, the depth of the molten copper is maximal and the confinement of the hydrogen bubbling action is maximal. Secondly, the furnace means is not adaptable to large pieces of copper such as, for example, cathode plates. Thirdly, the apparatus of FIGS. 6a and 6b is capable only of batch type processing, since the feeding, hydrogen treatment, vacuum treatment and discharging are accomplished successively so that each one prohibits performance of the others.

Because of the aforementioned disadvantages, some of which result in reduced purification efficiency and some of which result in lack of economy, the simple apparatus of FIGS. 6a and 6b is not preferred for implementing the method of the present invention although it is practical and illustrative of the possibilities using strictly conventional means.

Figure 7:
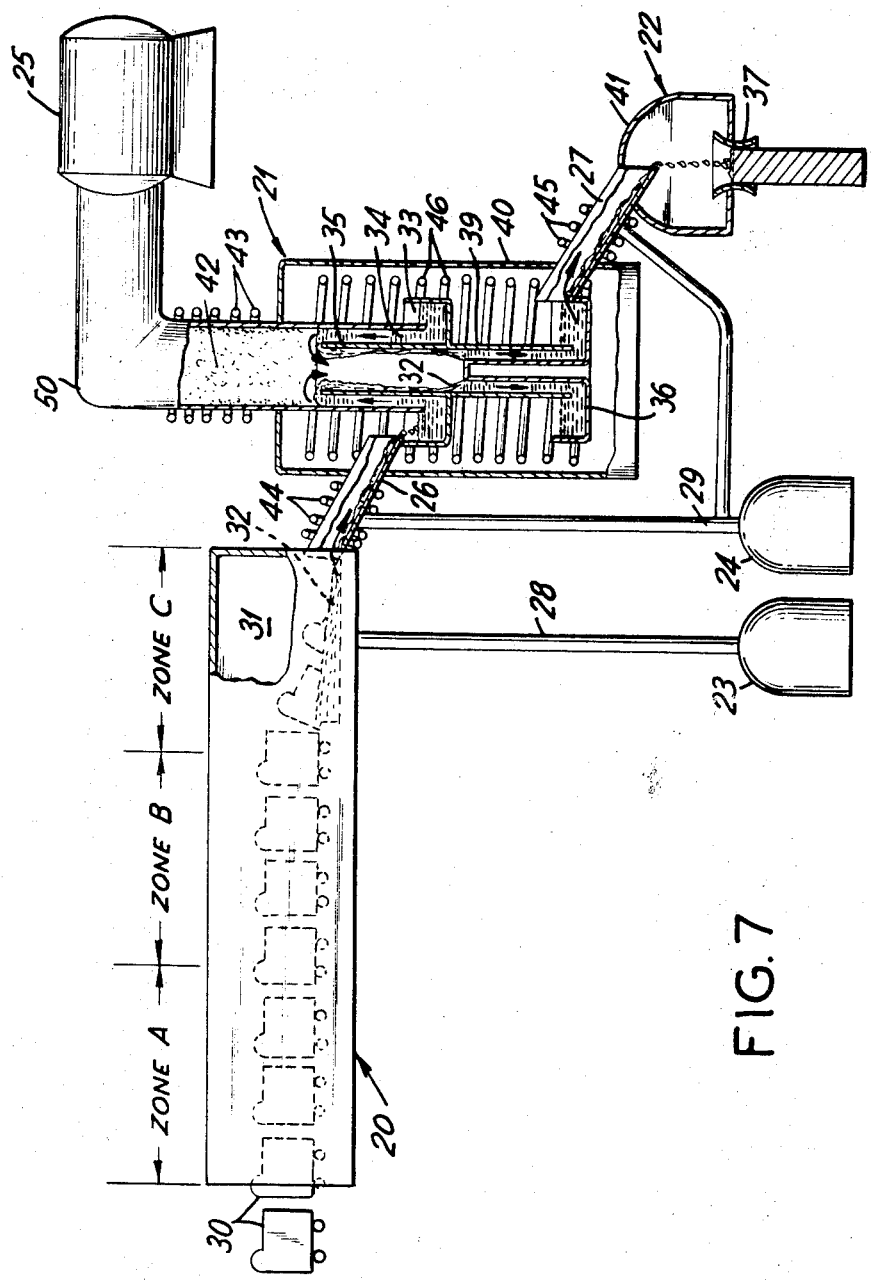
FIG. 7 is a diagrammatic illustration of preferred apparatus for implementing the method of the present invention.

Apparatus which has none of the disadvantages of the apparatus of FIG. 6 is shown in FIG. 7. FIG. 7 shows, in schematic diagram form, preferred apparatus for purifying copper in accordance with the present invention, in particular cathode copper. The apparatus of FIG. 7 provides for flexible optimum use of the purification process in accordance with the teachings of the present invention and for continuous processing; this apparatus hence achieves maximum purification efficiency and production economy. Essentially, the apparatus of FIG. 7 comprises a "zone-type" heating and melting furnace for the hydrogen treatment and a "flow through type" vacuum unit for the vacuum treatment. The "zone-type" furnace, being continually fed with cold cathode in turn continually feeds hydrogen treated molten copper into the "flow through type" vacuum unit which in turn feeds vacuum treated hydrogen treated molten copper into a casting unit for cooling and resolidification in useful shapes. It will be understood, of course, that insofar as the furnace of FIG. 7 is concerned a wide variety of "zone-type" furnaces are well known in metal treatment, varying as to heating methods, whether gas or electric or combination of the two, and varying as to geometrical arrangement, whether vertically or horizontally disposed or otherwise. Accordingly, the furnace of FIG. 7 is merely a typical example of such a zone-type furnace. On the other hand, insofar as the vacuum unit of FIG. 7 is concerned it should be noted that such units are not well known in copper purification. A vacuum unit broadly similar to unit 21 of FIG. 7 is described in detail later in conjunction with FIG. 8. Other broadly similar vacuum units appropriate to purposes of the present invention are illustrated and described in my copending application, entitled "Vacuum Purification of Metals," Ser. No. 483,601 filed Aug. 30, 1965 and now U.S. Pat. No. 3,402,921 and assigned to the assignee of this application. The subsidiary items of the apparatus of FIG. 7, that is to say the items other than the furnace and the vacuum unit, are all conventional being, generally speaking, well known in various arts including the copper purification art. Again, no detailed discussion of these subsidiary items is attempted since this also would detract from the main discussion; it may generally be understood in connection with these subsidiary items that the choice of particular designs thereof is somewhat arbitrary and largely a matter of convenience. Those respects in which the design choices of the various items of apparatus of FIG. 7 are preferably prescribed by the teachings of the present invention will be clear from the following account of the apparatus of FIG. 7.

With further reference to FIG. 7, 20 is a "zone-type" heating and melting furnace, 21 is a "flow through type" vacuum treating unit, 22 is a casting unit, 23 is a hydrogen atmosphere generator, 24 is an inert atmosphere generator, and 25 is a vacuum pumping system. In further detail, 26 is a launder connecting the output of furnace 20 to the input of vacuum unit 21, 27 is a launder connecting the output of vacuum unit 21 to the input of casting unit 22, 28 is a pipe connecting atmosphere generator 23 to furnace 20, 29 is a pipe connecting inert atmosphere generator 24 to launders 26 and 27, and 50 is a pipe connecting pumping system 25 to vacuum unit 21.

With further reference to FIG. 7, copper cathodes 30, after entering furnace 20 edgewise one after another on rollers, are progressively heated in passage along furnace 20 to a temperature of about 1000° C. in Zone A, are maintained at 1000° C. through zone B and are, finally, melted in zone C. Hydrogen atmosphere 31 from generator 23 is continually passed into and through furnace 20, to the exclusion of other atmosphere, exiting in the region of entry of the cathodes 30 and there being burnt or otherwise disposed of. Molten copper 32 from zone C of furnace 20 flows down launder 26 into reservoir 33 of vacuum unit 21, thence up to annular gap 34, thence down surface 35 into reservoir 36 and thence down launder 27 into casting mold 37 of casting unit 22. Inert atmosphere is continually passed into and through launders 26 and 27 passing thence between inner shell 39 and outer shell 40 of vacuum unit 21 and also passing into cover 41 of casting unit 22, to the exclusion throughout of other atmosphere. The molten copper forms a seal between the pipe 50 and the space between outer shell 40 and inner shell 39. Copper vapor and volatile impurities 42 issuing from the molten copper 32 in passage through vacuum unit 21 are continuously condensed on the walls of pipe 50 by water cooling coil 43. The impurities are solid and can be removed periodically from the walls of pipe 50. Launder 26 and 27 are shown to be heated, for example, by electric induction coils 44 and 45. Vacuum unit 21 is, for example, shown to be heated by electric induction coil 46. Heating coils 44, 45 and 46 supply sufficient heat to overcome heat losses and maintain the molten copper 32 molten without significantly raising its temperature. Not shown in FIG. 7, for sake of clarity, are heating means for furnace 20; these heating means may be understood to be, for example, radiant gas tube heaters for zones A and B and indirect induction heaters for zone C.

With further reference to FIG. 7, assuming the heat input is sufficient, the speed of travel of cathodes 30 along furnace 20 of course determines the rate of flow of molten copper 32 through vacuum unit 21. In conjunction with the speed of travel of the cathodes 30 the lengths of zones A, B and C of furnace 20 together determine the times and temperatures of the hydrogen treatment and thereby the amount of hydrogen dissolved in the molten copper 32 as it leaves furnace 21 through launder 26. (The proportion of hydrogen in the atmosphere from generator 23 is of course assumed to be fixed since this proportion also partly determines the rate of penetration of hydrogen into the cathodes 30.) As an example, with typical cathode copper a feed speed of 1 foot per minute is equivalent to a production rate of about 3 tons per hour; at this production rate, zone lengths in furnace 20 of zone A 15 feet, zone B 15 feet and zone C 10 feet result in about one volume of hydrogen (converted to normal temperature and pressure) being dissolved in each volume of copper with an atmosphere composed of approximately 40 percent hydrogen, 40 percent nitrogen and 20 percent carbon monoxide. Under these circumstances a purification efficiency, insofar as oxygen removal is concerned, of about 95 percent is attained. For further example, if the production rate is doubled to 6 tons a hour, by doubling the cathode feed speed and increasing heat input to furnace 20 as necessary, conditions otherwise remaining unchanged, the amount of dissolved hydrogen is approximately halved but the oxygen removal efficiency is reduced only a few percent. The reason that the purification efficiency of the hydrogen treatment is only fractionally reduced when the production rate is doubled is, as mentioned earlier, that the bulk of the copper oxide impurity in typical cathode copper is confined to the surface of the cathode plates. The above two examples illustrate the significance of zone arrangement in furnace 20 and further illustrate that, within limits, the amount of dissolved hydrogen in the molten copper 32 leaving furnace 20 can be varied widely without substantially affecting the efficiency of the hydrogen treatment insofar as oxygen removal from cathode copper is concerned. The amount of dissolved hydrogen in the molten copper 32 leaving furnace 20 is, as discussed at some length previously, of great significance to the vacuum treatment in vacuum unit 21. On one hand, the amount of dissolved hydrogen in conjunction with the production rate partly determines the capacity required of the vacuum pumping system 25, the greater the amount at a given production rate, obviously, the greater the pumping capacity required. For example, at a production rate of 3 tons per hour, as in the earlier example above, a pumping capacity of about 8000 cubic feet per minute is required of pumping system 25 to maintain an average pressure of one-tenth of a millimeter of mercury in vacuum unit 21. This estimate of pumping capacity assumes that the dissolved hydrogen is substantially completely removed from the molten copper as it flows through vacuum unit 21 at the 3 ton per hour rate and therefore also assumes that the hydrogen escapes the copper at a fast enough rate to complete the removal in time of passage through vacuum unit 21. The rate of escape of hydrogen from the molten copper as it flows through vacuum unit 21 is partly determined by the size and geometry of the inner surfaces of vacuum unit 21 and by the flow pattern of the molten copper over these surfaces. It is obvious therefore that in actual practice not only the pumping capacity of pumping system 25, but also the size and geometry of the inner surfaces of vacuum unit 21 and the flow pattern of molten copper over these surfaces need to be related to the amount of dissolved hydrogen and to the production rate. On the other hand, the amount of dissolved hydrogen, in relation to all the other factors mentioned above, determines the degree and duration of the bubbling action due to issuance of hydrogen from the molten copper in vacuum unit 21 and hence partly determines the purification efficiency of the vacuum treatment insofar as removal of volatile impurities is concerned. Hence, in the situation that substantial removal of volatile impurities is required, there is advantage to having a high level of dissolved hydrogen in the molten copper 32 on leaving furnace 20 even though, as previously mentioned, the oxygen removal efficiency is not significantly affected.

The apparatus of FIG. 7 is started as follows, assuming furnace 20 empty and off, hydrogen atmosphere generator 23 off, inert atmosphere generator 24 off, vacuum pump 25 off, reservoir 33 empty and reservoir 36 almost full of solid copper:

1. generator 24 is turned on and the whole apparatus flushed with inert atmosphere;

2. generator 23 is turned on, furnace 20 filled with hydrogen atmosphere (the hydrogen atmosphere pressure being sufficient substantially to restrict the entry of inert atmosphere into furnace 20 via launder 26) and a flow of hydrogen established through furnace 20.

3. heaters 44, 45 and 46 are turned on and launders 26 and 27 and vacuum treatment unit 21 brought to operating temperature (about 1250° C.). (When vacuum treatment unit 21 reaches operating temperature solid copper in reservoir 36 will have melted and reservoir 36 will be almost full of molten copper).

4. furnace 20 is turned on and brought to operating temperature;

5. movement of cathodes 30 is started;

6. when reservoir 33 is almost full of molten copper, vacuum pump 25 is turned on (it should be noted that the capacity of reservoir 33 exceeds the capacity of annular gap 34 by an amount sufficient to ensure a seal after reservoir 33 is partially emptied into annular gap 34).

It will be understood from the foregoing that a great number of factors bear upon the optimum use of the design of apparatus such as in FIG. 7. It will by now be equally understood that apparatus such as in FIG. 7 if used in optimum manner for purifying copper to a certain degree with maximum economy may also be used for purifying copper to a different degree, albeit with less than maximum economy. For example, if furnace 20, vacuum unit 21, and pumping system 25 are used in optimum manner, in conjunction with a certain production rate, for substantially complete oxygen removal but incomplete volatile impurity removal, a more complete removal of volatile impurities may readily be achieved, as previously outlined, by decreasing the production rate. This flexibility in the use of the apparatus is of course a valuable feature since whereas for a majority of applications the presence of a certain amount of volatile impurity in the purified copper is not significant, for a few applications such residual impurity is undesirable.

Figure 8:
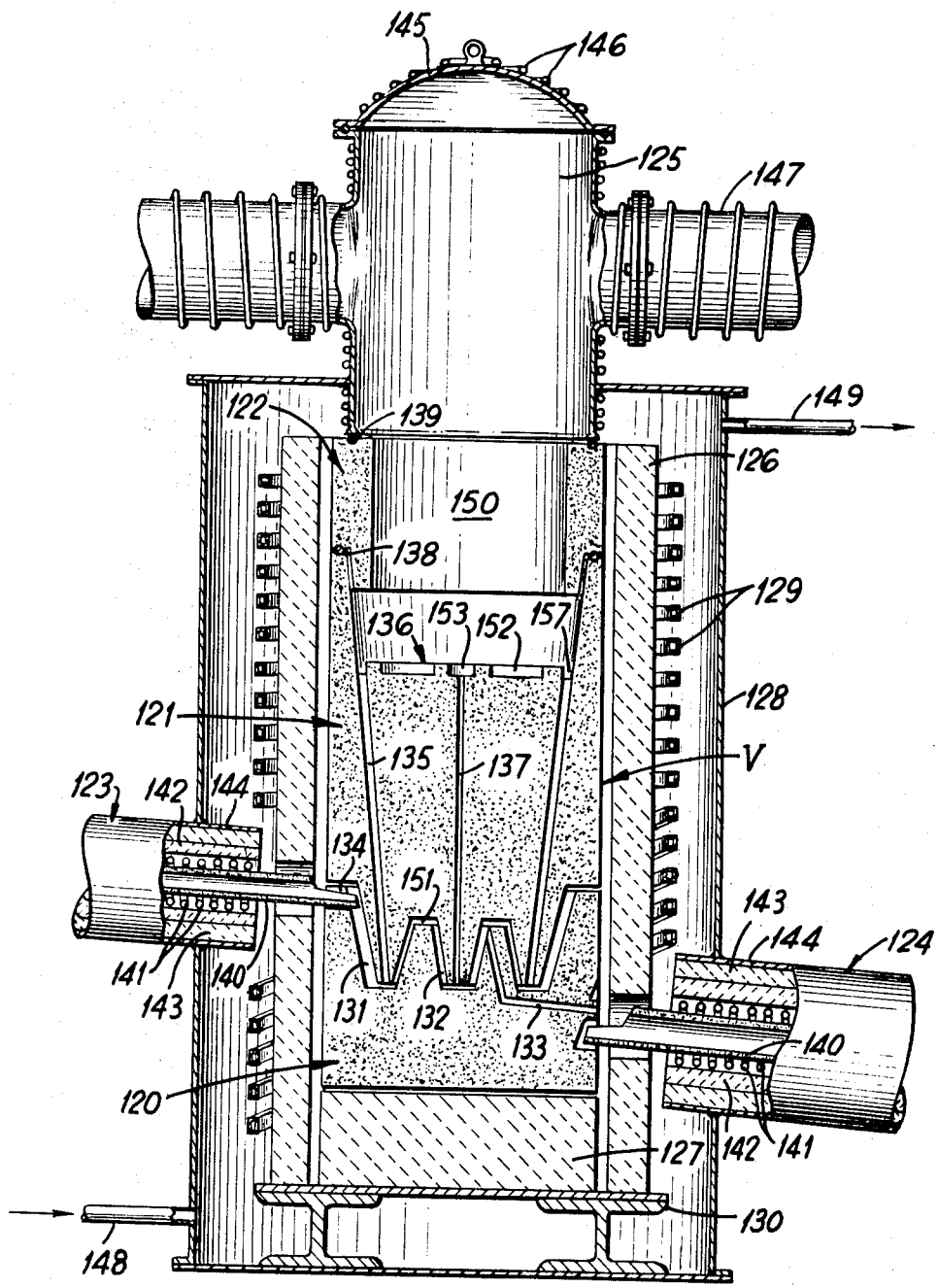
FIG. 8 is a diagrammatic illustration of a preferred vacuum unit showing practical constructional details of certain parts of the unit.

Attention is now directed to FIG. 8 which illustrates the constructional details of a vacuum unit broadly similar to unit 20 of FIG. 7. The purpose of FIG. 8 and of the following description of the unit illustrated in FIG. 8 is merely to point up some practical features of a vacuum unit appropriate to the present invention, such features being, generally speaking, not so well known as, for example, features of appropriate furnace units.

With reference first to both FIGS. 7 and 8 it will be noted that input launder 123 and output launder 124 of FIG. 8 correspond, respectively to launders 26 and 27 of FIG. 7 and that vacuum system connection pipe 147 of FIG. 8 corresponds to pipe 50 of FIG. 7; other correspondence and similarity between unit 20 of FIG. 7 and the apparatus of FIG. 8 will be apparent later.

With reference now to FIG. 8, the main items of the unit are blocks 120, 121 and 122 which compose vacuum treatment chamber V, launder 123 and 124 which lead molten copper, respectively, into and out of chamber V, vacuum manifold 125 which connects the vacuum pumping system (not shown) to chamber V, insulating shell 126 and insulating block 127 which reduce the heat loss from chamber V, induction heating coil 129 which heats chamber V, and support platform 130 which forms the base for chamber V. In further detail of chamber V, 131 is the input reservoir formed between blocks 120 and 121, 132 is the output reservoir formed between blocks 120 and 121, 133 is the output bore hole connecting output reservoir 132 with launder 124, 134 is the input channel connecting launder 123 with input reservoir 131, 135 is one of 12 feed bores spaced equally on a circle connecting input reservoir 131 to exposure surface 136, 137 is the output feed bore connecting exposure surface 136 with output reservoir 132, 138 is the lower sealing ring for ensuring a vacuum tight joint between blocks 121 and 122, 139 is the upper sealing ring for ensuring a vacuum tight joint between block 122 and vacuum manifold 123, 152 is an annular depression in exposure surface 136 for maintaining a pool of molten copper, 153 is a circular depression in exposure surface 136 for leading molten copper flowing over the pool in depression 152 into feed bore 137, and 157 is an annular groove for distributing the flow from feed bores 135 around the periphery of surface 136. In further detail of launders 123 and 124, which are identical in constructional detail, 140 is the feed tube carrying the molten copper, 141 is the resistance heating element for heating feed tube 140, and 142 and 143 are heat insulating tubes for restricting the heat loss from element 141 and tube 140. In further detail of enclosure 128, 148 and 149 are inlet and outlet tubes respectively for maintaining an inert gas atmosphere within enclosure 128 and within launder feed tubes 123 and 124. In further detail of vacuum manifold 125, 145 is a removable cover for access to remove condensed impurities, 146 is a water cooling coil for providing a cooled surface on the inside of manifold 125 for condensation of condensable impurities volatilized from molten copper flowing over surface 136 and 147 is one of two pipes connecting vacuum manifold 125 to two identical vacuum pumping systems. These two vacuum pumping systems which are not shown in FIG. 8 for sake of clarity in the main detail are wholly conventional and each comprise, for example, a combination of mechanical pumps operating efficiently in the pressure range of between 20 and 100 microns of mercury.

It will by now be apparent that the configuration of the vacuum exposure chamber V of FIG. 8 is somewhat different insofar as is concerned the reservoir arrangements, the feeding and discharge arrangements and the exposure surface from the configuration of unit 21 of FIG. 7. However, it will be readily understood that the broad principles of operation of the apparatus of FIG. 8 and unit 21 of FIG. 7 are identical; which is to say, molten copper is fed to and discharged from the exposure surface of each by gravity action in conjunction with barometric action. This barometric action is of course due to the difference between the approximately atmospheric pressure acting on the surface of the molten copper in the reservoirs and the vacuum pressure, generally less than 1 mm. of mercury, acting on the molten copper at the upper ends of the feed bores (FIG. 8) or the feed gaps (FIG. 7). Accordingly the vertical lengths of the feed bores 135 and 137 of FIG. 8 and the corresponding feed gaps of unit 20 of FIG. 7 are such that barometric columns of molten copper are maintained between the reservoirs and the exposure surface and are such that, in each case, raising the level of molten copper in the input reservoir, as by feeding molten copper from the input launder, results in a flow of molten copper via the exposure surface into the output launder. The height of a barometric column of molten copper equivalent to atmospheric pressure is about 47 inches and so, for example, it will be readily understood that a vertical height of feed bores 135 and 137 in FIG. 8 of 53 inches allows for an overflow from output reservoir 132 when reservoir 132 contains molten copper to a depth of about 6 inches and, further, that molten copper flows from input reservoir 131, up feed bores 135, across exposure surface 136, down feed bore 137, into reservoir 132, down borehole 133 and into launder 124 so long as the depth of molten copper in reservoir 131 exceeds the depth in reservoir 132, which is to say exceeds about 6 inches.

With further reference to FIG. 8, blocks 120, 121 and 122, which constitute chamber V, are composed of compacted graphite. An alternative material for blocks 120, 121 and 122 is compacted refractory oxide material but in which case heating cannot be accomplished by induction and induction coil 129 is therefore replaced by molybdenum or other suitable resistance heating elements located between shell 126 and chamber V. It may be noted that the inert atmosphere contained in enclosure 128 serves purpose in protecting both the molten copper and the hot graphite from atmospheric attack and, further, renders largely innocuous the inevitable small leakage from enclosure 128 into the inside of chamber V due to leakage past sealing rings 138 and 139 due to permeability of blocks 120, 121 and 122. It will be apparent that block 122 would be dispensed with were block 121 to be extended upward so as itself to meet vacuum manifold 125. Hence the inclusion of block 122 in FIG. 8 is merely to illustrate how a substantial depth of chamber V above exposure surface 136 may be economically furnished so as to provide a sufficient depth of heated surface above exposure surface 136 to accommodate the effects of the rather violent agitation of the molten copper that ensues from the hydrogen removal from the molten copper and which, as explained previously, assists in the volatile impurity removal. In this latter connection it will be noted that exposure surface 136 of FIG. 8 is substantially horizontal; whereas, the exposure surface of unit 20 of FIG. 7 is substantially vertical. Generally speaking a horizontal exposure surface is to be preferred where substantial removal of volatile impurities is required at moderate throughout rates whereas a vertical exposure surface is to be preferred where only partial removal of volatile impurities is required but at high throughput rates. The reasons for these somewhat different capabilities of these two particular configurations of exposure surfaces lie mainly in the different dispositions of the two exposure surfaces with respect to the cooled surfaces upon which the volatile impurities condense and in the different amounts of gravity action causing the flow of molten copper over the two exposure surfaces. However, it will be understood that, despite these differences which prescribe somewhat different optimum uses for the two configurations of exposure surface, by judicious regulation of the amount of dissolved hydrogen, the vacuum system pumping capacity and the flow rate of the molten copper, as earlier discussed, both types of surface can achieve high purification efficiency over a wide range of impurity levels and over a wide range of requirements for impurity removal. Hence, it will be understood that the design of the vacuum treatment unit for use in apparatus such as the apparatus of FIG. 7 is not critical, the purpose of the present invention being mainly accomplished efficiently by judiciously correlating control of such operational parameters as nature and duration of hydrogen treatment, vacuum system pumping capacity and production rate, as discussed earlier. Hence, further and in conclusion, it will now be understood that a wide variety of broad types of apparatus ranging from the batch processing type illustrated in FIG. 6, at one extreme, to the continuous processing type illustrated in FIG. 7, at the other extreme, may be used to purify copper in accordance with the present invention and that this variety of types of apparatus each essentially comprise coordinated means for successively hydrogen treating and vacuum treating copper.

I claim:

1. Apparatus for purifying copper including furnace means for melting copper in an atmosphere containing hydrogen, means for generating said atmosphere containing hydrogen, a vacuum enclosure, means for transferring said molten copper to said vacuum enclosure, means for circulating said molten copper through said vacuum enclosure, means for maintaining said molten copper molten in said vacuum enclosure, pumping means for maintaining a very low pressure relative to atmospheric pressure in said vacuum enclosure, means for transferring said molten copper from said vacuum enclosure, and means for cooling and resolidifying said molten copper.

2. Apparatus as in claim 1 in which the furnace means is a zone-type furnace wherein the copper is progressively preheated and finally melted.

3. Apparatus as in claim 1 in which the means for transferring molten copper to and from said vacuum enclosure are in part integral with the means for circulating said molten copper through said vacuum enclosure.

4. Apparatus as in claim 1 in which the means for transferring molten copper to and from said vacuum enclosure include means for exposing said molten copper only to inert atmosphere during the transfer step.

5. Apparatus as in claim 1 in which the means for circulating said molten copper through said vacuum enclosure includes reservoir means at the inlet of the vacuum enclosure and reservoir means at the outlet of the vacuum enclosure.

6. Apparatus for the purification of copper including furnace means for preheating copper in an atmosphere containing hydrogen, means for generating said hydrogen atmosphere, means for melting said heated copper, a vacuum enclosure, means for transferring said molten copper to said vacuum enclosure, means for circulating said molten copper through said vacuum enclosure, means for transferring said molten copper from said vacuum enclosure, pumping means for maintaining a low pressure relative to atmospheric pressure within said vacuum enclosure, heating means for maintaining copper in a molten state within said vacuum enclosure and means for cooling and resolidifying said transferred-out molted copper.

7. Apparatus as claimed in claim 6 which includes means for generating an inert atmosphere and which also includes means for melting said heated copper in said inert atmosphere.

8. Apparatus as in claim 7 in which said transferring means include means for protecting said molten copper from atmospheric contamination while transferring and in which said cooling and resolidifying means includes means for protecting said molten copper from atmospheric contamination while cooling and resolidifying.